Dec. 4, 1934.    C. C. ROSE ET AL    1,983,243
BATTERY CHARGE CONTROL SYSTEM
Original Filed May 21, 1931
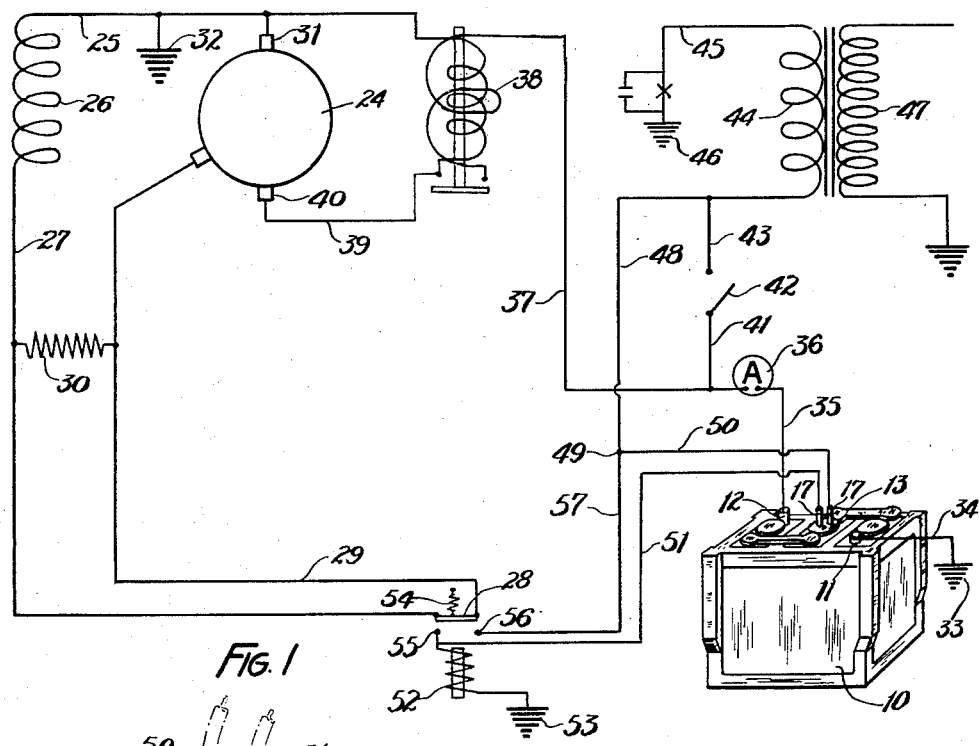
Fig. 1
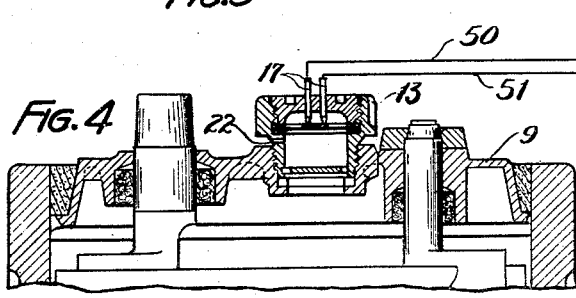
Fig. 3
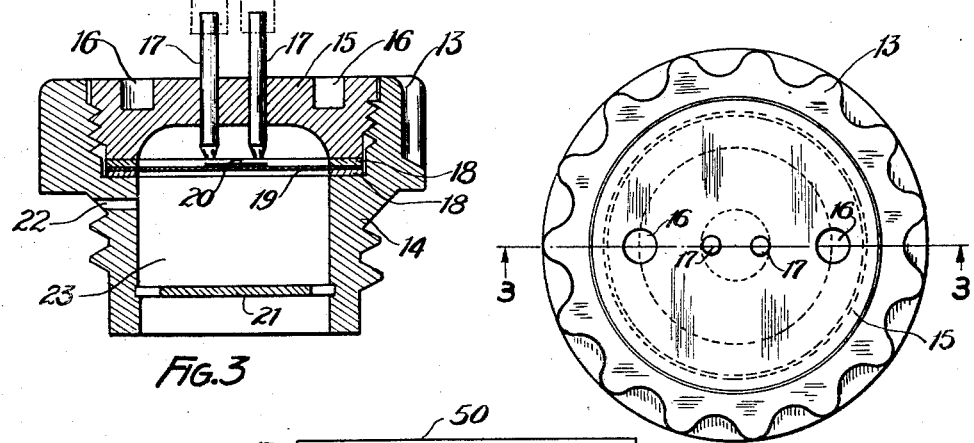
Fig. 2
Fig. 4
INVENTORS:
JOHN ALTMAYER
CLARENCE C. ROSE.
BY Kwis Hudson & Kent
ATTORNEYS.

Patented Dec. 4, 1934

1,983,243

UNITED STATES PATENT OFFICE 1,983,243

BATTERY CHARGE CONTROL SYSTEM

Clarence C. Rose and John Altmayer, Cleveland, Ohio, assignors to Willard Storage Battery Company, Cleveland, Ohio, a corporation of West Virginia Application May 21, 1931, Serial No. 539,054
Renewed July 18, 1934

4 Claims. (Cl. 171—314)

This invention relates to improvements in battery charge control systems, having reference particularly to batteries for motor vehicles and the charging of the same through the operation of an electric generator driven by the vehicle engine. However, the invention is not confined to automotive systems, but has utility, for example, in isolated farm lighting plants.

One of the objects of the invention is the provision of simple automatic means for interrupting or retarding the charging operation whenever the battery approaches the state of full charge.

Another object is the provision of a system of this kind wherein the pressure of gas generated in the battery is employed to effect the desired regulation.

A further object is the provision of means for closing the electric control circuit when the gas pressure exceeds a predetermined value, as distinguished from opening the control circuit at such times, this arrangement being adopted in order that any accidental disabling of the control circuit will not interfere with the charging of the battery at the normal rate.

Still another object is the provision of means acting when the control circuit is closed for holding it closed without regard to the gas pressure conditions in the battery until such time as the battery charging action of the generator is interrupted, as for instance when the vehicle engine is stopped by the opening of the ignition circuit, whereupon the control elements resume their normal positions.

Other objects and features of novelty will appear as we proceed with the description of that embodiment of the invention which, for the purposes of the present application, we have illustrated in the accompanying drawing, in which Figure 1 is a wiring diagram illustrating the system.

Fig. 2 is a plan view of a storage battery vent plug in which the automatic control switch of the system is mounted, Fig. 3 is a diametrical sectional vew of the said vent plug, taken substantially on the line 3—3 of Fig. 2, and Fig. 4 is a vertical sectional view through a cell of the storage battery, showing our special vent plug in position therein.

In the drawing a storage battery of the type commonly employed in automobiles is illustrated at 10. The terminal posts thereof are indicated at 11 and 12. The vent plug 13 of one of the cells is of special construction, as illustrated in Figs. 2 and 3, in order to accommodate the automatic control switch employed in connection with the invention. This special vent plug may of course be employed in any one of the three cells, as may be most convenient; or if desired, and if the size of the battery will permit, the automatic switch may be mounted in a separate plug so as not to interfere in any way with the ordinary use of the vent plugs.

The vent plug 13 may, and preferably does, comprise a body portion 14 threaded for insertion in the usual way into the cell cover 9, and a circular insert 15 threaded into the upper open end of the body portion 14. A pair of sockets 16 are formed in the insert 15 for the reception of a spanner wrench by means of which the two parts may be assembled or disassembled. Near the center of the insert 15 we mount two contact pins 17 which fit tightly in their sockets and project from the lower as well as from the upper surface of the insert. Interposed between the insert 15 and an internal shoulder formed on the body portion 14 of the vent plug are a pair of gaskets 18 between which is mounted a flexible diaphragm 19, formed preferably of rubber. The diaphragm 19 carries on its upper surface a metallic disc 20 which is adapted to bridge the lower extremities of the contact pins 17 when the diaphragm is flexed upwardly. Mounted in the body portion 14 of the filler cap near the lower end thereof is a baffle plate 21 of the usual form, having openings which permit the upward passage of gas generated in that cell of the battery. 22 is a vent hole which stands above the level of the cell cover when the vent plug is threaded downwardly thereinto as far as it will go. This vent hole is of such size as to carry away such amounts of gas as are evolved during the charging of the battery up to the time when the degree of battery charge passes a safe upper limit. Thereafter pressure builds up in the chamber 23 above the baffle 21, raising the diaphragm 19 and causing the disc 20 to electrically connect the contact pins 17.

Referring now to Fig. 1 of the drawing, we have shown at 24 an electric generator having a field circuit comprising a conductor 25, a field coil 26, a conductor 27, a relay armature 28, a conductor 29, and a resistance 30 bridged across the conductors 27 and 29, the armature 28 and resistance 30 being thus arranged in parallel in the field circuit.

The charging circuit between the generator 24 and the battery 10 extends from brush 31 through conductor 25 to ground at 32, and from ground at 33 through conductor 34 to terminal post 11 of the battery, thence from terminal post 12 through conductor 35 to ammeter 36 and by way of conductor 37 through reverse current cut-out 38, conductor 39 and brush 40 back to the generator.

The ignition circuit extends from terminal post 12 of the battery through conductor 35 and ammeter 36 and through conductor 41, ignition switch 42, conductor 43, primary coil 44 of the ignition transformer, and conductor 45 to ground at 46, and thence from ground at 33 through conductor 34 and terminal post 11 back to the battery. High tension current is thus induced in secondary coil 47 of the transformer for ignition purposes.

The control circuit with which this invention is primarily concerned extends from terminal post 12 of the battery through that portion of the ignition circuit which includes the ignition switch 42 and thence through a conductor 48 to a junction point 49. Thence the control circuit goes through a conductor 50 to one of the contact pins 17, and from the other contact pin 17 through a conductor 51 and coil 52 of the control relay to ground at 53, and from ground at 33 through conductor 34 and terminal post 11 back to the battery. Whenever the evolution of gas in the battery cell causes the contact plate 21 to bridge the contact pins 17, coil 52 is energized and the armature 28 is pulled down against the action of spring 54 so as to bridge contact points 55 and 56, thereby necessitating the flow of all field circuit current through the resistance 30. At the same time the bridging of contacts 55 and 56 by armature 28 short-circuits conductors 50 and 51 and the automatic gas pressure switch. In other words, as soon as the points 55 and 56 are connected by armature 28 current flows from the battery through terminal post 12, through conductor 35, ammeter 36, conductor 41, ignition switch 42, conductor 43, conductor 48, to junction point 49 and thence through a conductor 57 to contact point 56, through armature 28 to contact 55 and thence through coil 52 to ground at 53 and from ground at 33 through conductor 34 back to terminal post 11 of the battery.

In the normal operation of the system the armature 28 will stand in the position illustrated in Fig. 1, and the resistance 30 will thus be short-circuited, so that the generator 24 will operate at its normal charging rate. When the battery becomes fully charged, or substantially so, the evolution of gas in the battery cell will proceed at a rate so rapid that the vent hole 22 will not be able to prevent the building up of pressure in the chamber 23. Hence the diaphragm 19 will rise and the contact plate 20 of the automatic control switch will close the control circuit across contact pins 17. Thereupon, as previously described, the control relay coil 52 will be energized and the armature 28 will be pulled down out of the generator field circuit and caused to bridge the contacts 55 and 56. Thereupon the rate of charge will be reduced considerably, the amount of reduction depending upon the amount of resistance introduced through the resistance 30, which can be regulated as desired in the design of the system. The gas control switch 17, 20 being thus short-circuited by the armature 28, as previously explained, a gradual decrease of gas pressure taking place in the chamber 23, whereby the disc 20 is permitted to fall away from contact with the pins 17, will not affect the circuit through coil 52. That circuit will remain energized through the bridging of contact points 55 and 56 by armature 28 as long as the ignition switch 42 remains closed. When, however, the vehicle engine is stopped by the opening of ignition switch 42, deenergizing coil 52, spring 54 will again raise armature 28, and the control elements will all be in their normal positions when the vehicle engine is again started.

The control relay is not necessarily tied up with the ignition switch of the engine. It might, for instance, be connected to the generator side of cut-out 38, so that it would be deenergized when the engine slowed down below a given speed, or the relay might of course be arranged to be deenergized by the operation of a hand switch.

The reduction of the charging rate of the generator might be accomplished by means other than that illustrated, as for instance some of the turns of the field windings might be cut out instead of cutting in field resistance. In other words any means for reducing ampere turns of the field circuit would be effective for this purpose.

In the foregoing description we have necessarily gone somewhat into detail in order to explain fully the particular embodiments of the invention herein illustrated, but we desire it to be understood that such detail disclosures are not to be construed as amounting to limitations, except as they may be included in the appended claims.

Having thus described our invention, we claim:

1. In a battery charge control system, a storage battery, a generator electrically connected with said battery for charging the same, a field circuit for the generator, a relay, means including contact means of the relay for reducing the ampere turns of the field circuit to thereby reduce the charging rate, a pressure responsive switch connected to said battery and having contact means adapted to be actuated by gas pressure in the battery, a circuit for putting the first mentioned means in operation including the coil of said relay and the contact means of the pressure responsive switch, said relay also having contact means for short circuiting the contact means of the pressure responsive switch for maintaining the reduced charging rate irrespective of the gas pressure in the battery, and means for opening the circuit established through the last mentioned contact means for discontinuing the reduced charging rate.

2. In a battery charge control system the combination of a storage battery to be charged, a generator operatively connected to said battery for charging the same, a field circuit for said generator, a resistance adapted to be connected into and short circuited from the field circuit for varying the charging rate, a pressure responsive switch connected to said battery and having contact means adapted to be actuated by gas pressure within the battery, a relay having a plurality of pairs of contacts and also having a magnet coil in circuit with the contact means of the pressure responsive switch, one of said pairs of contacts being in said field circuit and the contacts of a second pair being connected to the contact means of said pressure responsive switch, said relay also having a movable element normally in engagement with said one pair of contacts for short circuiting said resistance out of the field circuit and adapted to be moved away from said one pair of contacts to reduce the charging rate and into engagement with said second pair of contacts to thereby short circuit the contact means of the pressure responsive switch for maintaining the reduced charging rate, and means for deenergizing the relay to discontinue the reduced charging rate.

3. In a battery charging system, a storage battery, a generator electrically connected with said battery for charging the same, means for reducing the charging rate of the generator, a relay adapted when energized to render the charge reducing means effective, a pressure responsive switch connected to the battery and having contact means adapted to be actuated by gas pressure in the battery, an energizing circuit for said relay including the contact means of said pressure responsive switch, a second energizing circuit for said relay including contacts of the relay adapted to be closed upon energization of the relay, and a manually operable switch in said second energizing circuit.

4. In a battery charging system, a storage battery, a generator electrically connected with said battery for charging the same, means for reducing the charging rate of the generator, a relay adapted when energized to render the charge reducing means effective, a pressure responsive switch connected to the battery and having contact means adapted to be actuated by gas pressure in the battery, an energizing circuit for said relay including the contact means of said pressure responsive switch, a second energizing circuit for said relay including contacts of the relay adapted to be closed upon energization of the relay, an ignition circuit adapted to be energized from said battery and including a conductor which is common to the ignition circuit and to said second energizing circuit, and a switch in said common conductor.

CLARENCE C. ROSE.
JOHN ALTMAYER.